April 13, 1965 D. S. NEWCOMER 3,178,189
PHONOGRAPH ACCESSORY
Filed June 12, 1961 2 Sheets-Sheet 1
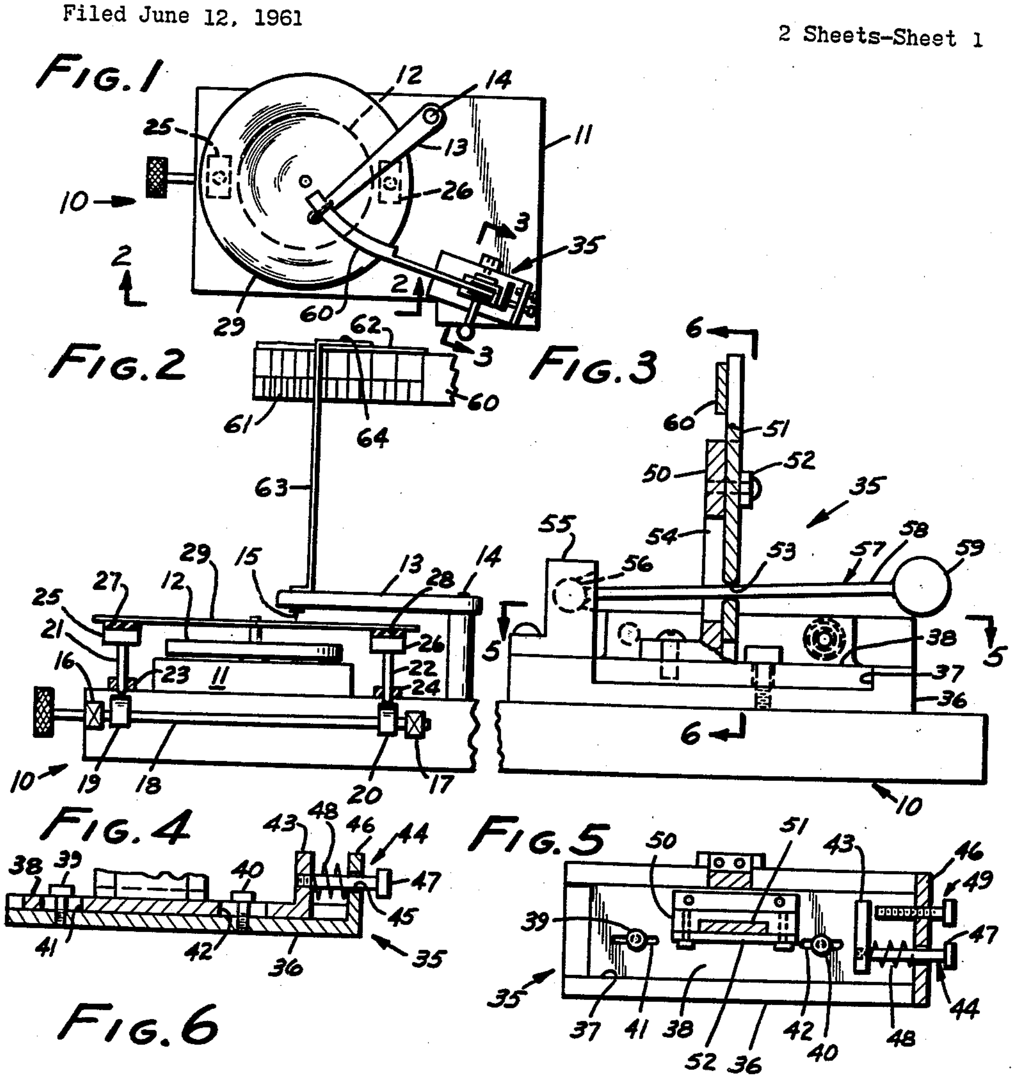
FIG. 1, FIG. 2, FIG. 3, FIG. 4, FIG. 5, FIG. 6
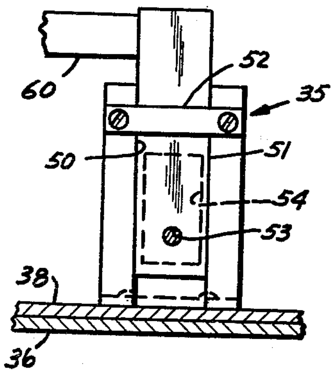
INVENTOR.
DONALD S. NEWCOMER
BY
Angus & Mon
ATTORNEYS.

April 13, 1965 D. S. NEWCOMER 3,178,189

PHONOGRAPH ACCESSORY

Filed June 12, 1961

2 Sheets-Sheet 2

INVENTOR.
DONALD S. NEWCOMER

BY Angus & Mon

ATTORNEYS.

3,178,189

PHONOGRAPH ACCESSORY

Donald S. Newcomer, Burbank, Calif., assignor, by mesne assignments, to Rheem Manufacturing Company, New York, N.Y., a corporation of California Filed June 12, 1961, Ser. No. 116,391
5 Claims. (Cl. 274—13)

This invention relates to a device for playing selected portions of phonograph records.

In the use of phonograph records for instructional purposes, for example in the teaching of languages, there is a need for a simple device which will enable a student to locate, play, and replay selected portions of the record. This will enable him to find and repeat portions which might, for example, aid him in enunciating words properly, which procedure requires repetitive playing of the examples on the record. An object of this invention is to provide a device which will enable a phonograph stylus readily to be placed at a preselected location on a phonograph record and to be stepped incrementally across the grooves to aid in locating given portions of the record, as well as in replaying such portions.

A related but optional object of the invention is to provide a device which can stop the rotation of the record so that the stylus will stand at some preselected location, and will then permit the record to be started again from that location almost instantly. Thus, a stylus can be prepositioned at a selected point on a record, and the record can readily be played from that point on at any later time.

Still another related but optional object of the invention is to provide a device which allows a phonograph record to be conveniently put on or taken off of the phonograph turntable, without interference by the device.

A device according to this invention includes a base adapted to be mounted adjacent to a phonograph turntable and a stylus arm. The base serves to support a lifter having a portion which is coincident with the locations which the stylus arm assumes as it moves across the record. Means are provided for raising the lifter so as to raise and lower the stylus arm and thereby lift the stylus from the record and return it to the record, and also to step the stylus incrementally across the grooves.

According to a preferred but optional feature of the invention, these latter means includes horizontal ways mounted to the base which supports a horizontally movable slide, which slide in turn carries vertical ways. The vertical ways supports a vertical slide, and the vertical slide is thereby rendered shiftable both vertically and horizontally to constitute means which mount the lifter and provide means for moving it.

According to a preferred but optional feature of the invention, the said means are provided as an elevatable, nutatable element to which the lifter is mounted, whereby the cross movement of the stylus is accomplished by a nutating action of the elevator means.

According to another preferred but optional feature of the invention, a limit stop is provided to limit the horizontal component of movement of the said means, which limit stop is adjustable so that the size of the horizontal increment of movement and in turn the number of grooves stepped over is rendered adjustable.

Still another preferred but optional feature of the invention resides in elevator means disposed beneath the phonograph record which is adapted to be raised and thereby lift the record off the turntable in order to stop its rotation at some selected location.

Still another optional feature of the invention resides in hinge mounting the lifter to the means for moving it so that the lifter can be swung out of the way of a phonograph record on the turntable to enable it readily to be removed and replaced.

The above and other features of this invention will be fully understood from the following detailed description and the accompanying drawings in which.

FIG. 1 is a top view of a phonograph equipped with the presently preferred embodiment of the invention;

FIG. 2 is a side elevation taken at line 2—2 of FIG. 1;

FIG. 3 is a side elevation partly in cutaway cross-section taken at line 3—3 of FIG. 1;

FIG. 4 is a fragmentary side view of a portion of the device in FIG. 1;

Figures 7, 8, 9, 10:
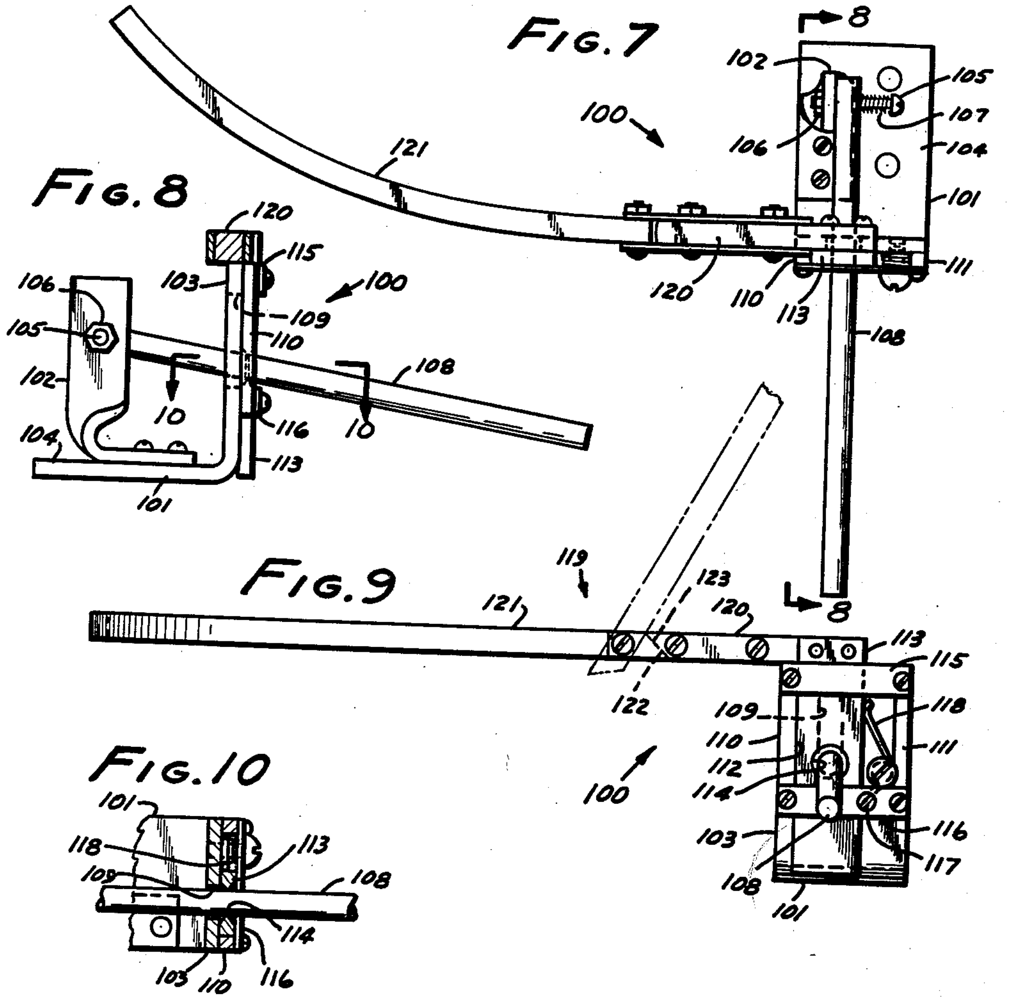

FIGS. 5 and 6 are cross-sections taken at lines 5—5 and 6—6, respectively, of FIG. 3;

FIG. 7 is a top view of another embodiment of the invention;

FIG. 8 is a cross-section taken at line 8—8 of FIG. 7;

FIG. 9 is a side elevation of the device shown in FIG. 6; and

FIG. 10 is a cross-section taken at line 10—10 of FIG. 8.

FIG. 1 shows a phonograph 10 including a base 11 which mounts a turntable 12 and a conventional stylus arm 13. The stylus arm is mounted by a pivot 14 at one end so that it can swing across the record in the plane of FIG. 1, and can also be raised at its free end, where it carries stylus 15.

The base of the phonograph supports a pair of bearings 16, 17, which act as support journals for a cam shaft 18. Cams 19, 20 are pinned to the shaft and turn with it. These cams support push rods 21, 22, which pass vertically through bushings 23, 24, respectively, in the top of the base. Pads 25, 26 are carried by the push rods, and are coated with facings 27, 28 of soft material, such as sponge rubber which facings serve as braking material to stop rotation of a phonograph record 29. This minimizes slippage of the record as it is just being lifted off the surface of the turntable.

The cams are so proportioned that when their rise portions are down, the push rods are also down, and the tops of the facings stand below the upper surface of the turntable. The phonograph record then rests on and is turned by the turntable. When the cams are turned to place the rise portions up, the facings are pushed above the turntable, as shown in FIG. 2, thereby lifting the phonograph record clear of the turntable and braking the phonograph record against rotation.

The presently preferred embodiment of stylus manipulating means 35 is shown in FIG. 1, wherein it is attached to the phonograph base. These manipulating means include (see FIG. 3) a base plate 36 which forms a horizontal ways 37 to receive a horizontal slide 38. This slide is retained in the ways by headed bolts 39, 40, whose shanks pass through longitudinal slots 41, 42 and whose heads overhang the edges of the slots. The horizontal slide is thereby adapted for right and left movement with reference to FIG. 5.

The horizontal slide is provided with a stop flange 43 at its right hand end in FIG. 5, to which there is threadedly attached a first limit stop 44. Stop 44 comprises a headed bolt whose shanks is passed through a hole 45 in an upright flange 46 at the right hand end of the base plate. A head 47 of stop 44 stands on the opposite side of flange 46 from stop flange 43. It will engage flange 46 when the horizontal slide is moved far enough to the left. A coil spring 48 surrounds the shank and biases the horizontal slide to the left. The spacing of head 47 from stop flange 43 can be adjusted by turning limit stop 44 in its mounting hole.

A second limit stop 49 comprises a threaded bolt threaded through and projecting beyond flange 46 so stop flange 43 strikes it when the slide moves far enough to the right. The position of limit stop 49 can also be adjusted by turning it in its threaded mounting hole.

A vertical ways 50 is bolted to the horizontal slide and supports a vertical slide 51 for vertical reciprocation. Slide 51 is held in the ways by a bar 52 (see FIG. 6). A hole 53 through the vertical slide stands within an area defined by an opening 54 in the vertical ways.

A socket member 55 is bolted to the horizontal ways. The socket stands at an elevation above the horizontal slide and holds the ball end 56 of a handle 57, which handle includes a rod 58 which passes through hole 53 and opening 54. A knob 59 on the free end of the handle can be gripped by the user. It will be seen that the knob can be moved horizontally or vertically, or in any combination of these movements, which will then be transmitted to the vertical ways.

A lifter 60 is mounted to the vertical slide. The lifter includes (FIG. 2) a scale 61 which may be used as a position reference for the stylus arm. The scale is curved (FIG. 1), with its center or curvature at pivot 14. A pad 62 of soft friction-type material, such as sponge rubber, forms a facing for the top of the lifter.

A riser 63 is attached to the stylus arm and projects upwardly. It has a flange 64 which overhangs the lifter. The device is so proportioned that when rod 58, and therefore the vertical slide, is at its lowermost position, the riser is supported by the phonograph record through the stylus. The lifter stands below the flange, and the stylus arm can move across the phonograph record as the record turns without impediment. Also, the flange can be picked up to move the stylus arm and place it at any selected location.

When the handle is lifted, the vertical slide moves upward, raising the lifter into contact with the flange to lift the stylus arm and remove the stylus from the phonograph record. The handle can be moved left or right within limits to move the stylus forward and backward.

The term "stylus manipulating means" is intended to define structure including the lifter and the means for moving it.

FIG. 7 illustrates an alternate embodiment of stylus manipulating means 100 which includes a base 101, having a pair of flanges 102 and 103 which project upwardly from the bottom portion 104 of the base. Bottom portion 104 is intended to be attached to the base of a phonograph, immediately adjacent to the turntable and the stylus arm.

A bolt 105 is mounted as a stud to flange 102 by nut 106. Its headed end projects away from the flange and stands at a distance therefrom. A spring 107 surrounds the shank of the bolt and is supported at one of its ends by a head of the bolt. The other end presses against a handle 108 which is mounted to flange 102 by passing the shank of the bolt through a hole in the handle. The spring and bolt arrangement permits the handle to be moved both up and down in FIG. 8 and to left and right in FIG. 7, this being the equivalent of a ball and socket joint which could be used instead of the arrangement shown.

Flange 103 includes a rectangular slot 109 through which the handle passes. A pair of side bars 110, 111 are attached to flange 103 at each side of the slot so as to form a slideway 112 between them which is wider than a plate 113 which is placed between them and which extends vertically above them. The plate has a hole 114 through it, and the handle passes through this plate.

Retainer bars 115, 116 are attached to side bars 110 and 111, thereby keeping plate 113 from falling out of the slideway. A fulcrum pin 117 is threaded through retainer bar 116, and is spaced from side bar 110 by a distance a little greater than the width of the plate. A bias spring 118 is attached to flange 103 and contacts the side of the plate at a vertical distance above fulcrum pin 117. A lifter 119 is mounted to plate 113.

Lifter 119 has a first segment 120 rigidly mounted to the plate and a second curved segment 121 hinge-mounted to it so that the curved segment which will normally overhang the phonograph record can be swung up to the position illustrated in FIG. 9 so as to stand out of the way of a phonograph record so it can more readily be removed and replaced. Alternately it could have been swung to the side, the object being to remove all or at least a major part of the lifter from over the record so the record can more readily be changed. A pad of sponge rubber or other similar material (not shown) may be put on the top of the lifter if desired, as in FIG. 1.

The ends 122, 123 of segments 120 and 121 are cut on a bias so as to abut each other when the second segment is in its lowermost position, thereby defining the normal operative position of the lifter. Base 101 and lifter 119 are ordinarily placed in the same relationship relative to the stylus arm and turntable as the device of FIG. 1 and may be used in place thereof. Also, the elevator means shown in FIG. 1 may be used in combination with stylus manipulating means 100, if desired. Stylus manipulating means 100 is somewhat simpler in construction and cheaper to manufacture than that shown in FIG. 1 but their ultimate functional objectives are identical.

The operation of the device of FIG. 1 should be evident from the above. With handle 58 at its lowermost position, the stylus arm can freely move across the record and can also be picked up by the riser and manually moved to any location. The scale helps to determine where the needle is along the record. Should it be desired to step the needle over incrementally, the needle is lowered by moving handle 58 downwardly. Then, depending on the direction the needle is to be moved, the handle is moved horizontally to the right or to the left. Then it is raised to lift the stylus arm and is then moved to the left or right as appropriate to carry out the incremental movement and then lowered again. The movement of the knob is therefore in a rectangular pattern. Whether the pattern is clockwise or counter-clockwise determines whether the needle is moved toward the center or toward the edge of the phonograph record.

It will thereby be seen that small incremental steps along the record can be regularly repeated simply by repeating this pattern every time a portion is to be replayed. Appropriate adjustments of one or both of the limit stops will determine the size of the increment, which can be made as small or as large as desired within the limits of the device.

The operation of the device of FIGS. 7–10 is similar to that of FIG. 1. To lift the stylus, the handle need merely be raised in FIG. 8, this serving to raise the lifter. Sidewise stepping movement of the lifter is accomplished by left or right hand movement of the handle. The movement is a nutating one, as can best be seen in FIG. 9, there being more freedom for lateral movement at the upper portion of the plate than at the lower portion adjacent to fulcrum pin 117. A nutating movement has been found to be as effective as the slide movement of FIG. 1. If desired, cam or screw limit stop means may be provided in FIG. 9 so as to limit the lateral movement of the plate, that is, movement to the right or left of the plate at a location spaced from the fulcrum pin.

The lifter, as illustrated in FIG. 9, is biased to a left hand position, so that when the handle is raised, it can move the plate only to the right, thereby stepping the stylus arm back a few grooves. Should it be desired to step the stylus ahead a few grooves, then the handle will be pushed to the right as it is raised so that the spring will thereupon tend to bias the lifter to the left in FIG. 9, stepping the stylus ahead.

The swinging action of the second curved segment 121 is shown in FIG. 9 which enables the lifter to be pivoted out of the way of the record, enabling it to be more readily changed. This segmenting of the lifter can be used in FIG. 1 as in FIG. 9.

It has been found in operation that either of the devices of FIGS. 1 and 7 will give the stylus a small backward step merely by raising the handle, even without a horizontal movement. It is theorized that this results from the existence of a small centrifugal force developed between the stylus and the groove of the rotating phonograph record. This appears to be enough to step the stylus back by perhaps a groove while it is being initially lifted by the lifter. Thus, even without moving the handle to the right or left, very small incremental adjustments can be obtained with this device.

Frequently, it is desired to combine incremental stepping with means for first finding a location on the phonograph record and then leaving the stylus at the exact spot until it is desired to play it. This result is attained by use of that portion best shown in FIG. 2. When the correct location is found, the cam shaft is turned, moving the pads into contact with the bottom of the record and lifting the record off of the turntable, so that while other adjustments remain undisturbed, this quickly stops the record. Turning the cam shaft to lower the pads returns the record to the turntable, where it quickly starts to turn.

This invention is not to be limited by the embodiment shown on the drawings and described in the description which is given by way of example and not of limitation, but only in accordance with the scope of the appended claims.

I claim:

1. A device for moving a phonograph stylus arm in increments comprising: a base; a horizontal ways on said base; a horizontal slide in said horizontal ways; a vertical ways mounted on said slide; a vertical slide in said vertical ways; a lifter rigidly mounted on the vertical slide; a flange on said lifter which overhangs the stylus arm;

a riser member mounted to and rising from the stylus arm and overhanging the lifter, whereby raising the vertical slide raises the lifter to engage the riser member, and moving the horizontal slide horizontally with the vertical slide in an elevated position serves to shift the stylus arm.

2. A device according to claim 1 in which a pad of friction-type material is attached to the top of the lifter beneath the flange.

3. A device according to claim 1 in which a graduated scale is provided on the lifter to be used with the riser as stylus arm position reference means.

4. A device according to claim 1 in which means is provided for moving the slides, comprising a pivotable handle mounted to the base and connected to the vertical slide at a location spaced from its mounting to the base, whereby movement of the handle moves the slides.

5. A device according to claim 1 in which at least a portion of the lifter is pivotally joined to the said vertical slide, whereby at least a part of the lifter can be swung so as not to overhang the phonograph record.

References Cited in the file of this patent

UNITED STATES PATENTS

| | | |
|---|---|---|
| 1,061,282 | Genesy | May 13, 1913 |
| 2,714,513 | Staar | Aug. 2, 1955 |
| 2,762,627 | Johnson | Sept. 11, 1956 |
| 2,969,241 | Wyrod | Jan. 24, 1961 |
| 2,977,125 | Mallina | Mar. 28, 1961 |
| 2,980,429 | Thevenaz | Apr. 18, 1961 |

FOREIGN PATENTS

| | | |
|---|---|---|
| 1,099,554 | France | Mar. 23, 1955 |